(12) United States Patent
Kaifu et al.

(10) Patent No.: US 9,398,281 B2
(45) Date of Patent: Jul. 19, 2016

(54) IMAGE PICKUP APPARATUS, COLOR CORRECTION METHOD, AND COLOR CORRECTION PROGRAM

(71) Applicant: Sony Corporation, Tokyo (JP)

(72) Inventors: Keita Kaifu, Tokyo (JP); Yasuhiro Matsui, Kanagawa (JP); Noriko Chino, Kanagawa (JP); Kiyotaka Nakabayashi, Saitama (JP); Tomoya Myojin, Kanagawa (JP); Junya Suzuki, Tokyo (JP); Manli Yuan, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/354,734

(22) PCT Filed: Nov. 13, 2012

(86) PCT No.: PCT/JP2012/079390
§ 371 (c)(1),
(2) Date: Apr. 28, 2014

(87) PCT Pub. No.: WO2013/080785
PCT Pub. Date: Jun. 6, 2013

(65) Prior Publication Data
US 2014/0300772 A1 Oct. 9, 2014

(30) Foreign Application Priority Data

Dec. 2, 2011 (JP) ................................. 2011-264959

(51) Int. Cl.
*H04N 3/14* (2006.01)
*H04N 5/335* (2011.01)
(Continued)

(52) U.S. Cl.
CPC .. *H04N 9/73* (2013.01); *G03B 7/18* (2013.01); *G03B 7/22* (2013.01); *G03B 9/02* (2013.01); *H04N 5/217* (2013.01); *H04N 5/238* (2013.01); *H04N 9/04* (2013.01); *H04N 9/045* (2013.01); *H04N 9/07* (2013.01); *H04N 9/735* (2013.01); *G02B 26/02* (2013.01)

(58) Field of Classification Search
CPC ......... H04N 9/73; H04N 9/735; H04N 9/045; H04N 9/04; H04N 5/238; G02B 26/02
USPC .............................. 348/272–276, 223.1–229.1
See application file for complete search history.

(56) References Cited

U.S. PATENT DOCUMENTS 6,952,233 B2 * 10/2005 Nagano ........................ 348/362

FOREIGN PATENT DOCUMENTS

| JP | 06-054253 | 2/1994 |
| JP | 06-078208 | 3/1994 |

(Continued)

*Primary Examiner* — Yogesh Aggarwal
(74) *Attorney, Agent, or Firm* — Chip Law Group

(57) ABSTRACT

An image pickup apparatus includes: a dimming device configured to adjust light quantity of incident image pickup light; an image pickup device configured to obtain an image pickup signal based on image pickup light emitted from the dimming device; and a color correction processing section configured to perform color correction on the image pickup signal that is obtained by the image pickup device, based on information relating to light quantity of the image pickup light emitted from the dimming device. The color correction processing section performs the color correction to allow a color balance value of the image pickup signal to be substantially constant independent of the light quantity of the image pickup light emitted from the dimming device.

15 Claims, 13 Drawing Sheets

(51) Int. Cl.
*H04N 9/73* (2006.01)
*H04N 9/04* (2006.01)
*H04N 5/238* (2006.01)
*H04N 5/217* (2011.01)
*H04N 9/07* (2006.01)
*G03B 7/22* (2006.01)
*G03B 7/18* (2006.01)
*G03B 9/02* (2006.01)
*G02B 26/02* (2006.01)

(56) References Cited

FOREIGN PATENT DOCUMENTS

| | | |
|---|---|---|
| JP | 10-032832 | 2/1998 |
| JP | 2001-142050 A | 5/2001 |
| JP | 2011-017819 A | 1/2011 |

\* cited by examiner (A)

| Item | | Itra | | | | |
|---|---|---|---|---|---|---|
| | | 0 (DARK) | 0.19 | 0.57 | 0.95 | 1.33 (BRIGHT) |
| -10°C | R_Gain | 0.4835 | 0.4725 | 0.4615 | 0.4505 | 0.4395 |
| | B_Gain | 0.4788 | 0.4888 | 0.4988 | 0.5088 | 0.5188 |
| 10°C | R_Gain | 0.4885 | 0.4787 | 0.4690 | 0.4592 | 0.4495 |
| | B_Gain | 0.4738 | 0.4825 | 0.4913 | 0.5000 | 0.5088 |
| 30°C | R_Gain | 0.4935 | 0.4850 | 0.4765 | 0.4680 | 0.4595 |
| | B_Gain | 0.4688 | 0.4763 | 0.4838 | 0.4913 | 0.4988 |
| 50°C | R_Gain | 0.4985 | 0.4912 | 0.4840 | 0.4767 | 0.4695 |
| | B_Gain | 0.4638 | 0.4700 | 0.4763 | 0.4825 | 0.4888 |
| 70°C | R_Gain | 0.5035 | 0.4975 | 0.4915 | 0.4855 | 0.4795 |
| | B_Gain | 0.4588 | 0.4638 | 0.4688 | 0.4738 | 0.4788 |

( ▒ ... COLOR CORRECTION VALUE OBTAINED BY LINEAR INTERPOLATION (LINEAR FUNCTION INTERPOLATION) )

IMAGE PICKUP APPARATUS, COLOR CORRECTION METHOD, AND COLOR CORRECTION PROGRAM

TECHNICAL FIELD

The present disclosure relates to an image pickup apparatus obtaining an image pickup signal with use of a dimming device, and to a color correction method and a color correction program that are applied to such an image pickup signal.

BACKGROUND ART

In an image pickup apparatus such as a digital camera (a digital still camera), a diaphragm (an iris) that performs mechanical dimming operation (light quantity adjustment) is typically provided as a dimming device adjusting light quantity of image pickup light. Moreover, recently, as an alternative to such a mechanical diaphragm, an electrical dimming device (a liquid crystal dimming device) using a guest-host (GH) type liquid crystal that contains dichroic pigment has been proposed (for example, refer to PTL 1).

CITATION LIST

Patent Literature

PTL 1: Japanese Unexamined Patent Application Publication No. 2001-142050

SUMMARY OF INVENTION

Incidentally, in the image pickup apparatus incorporating the various kinds of dimming device as described above, an image pickup signal is obtained by the image pickup device through such a dimming device. As for the image pickup signal obtained in such a way, it is assumed a case where color correction is necessary depending on situations, and thus a method of achieving appropriate color correction is desired.

Therefore, it is desirable to provide an image pickup apparatus, a color correction method, and a color correction program that are capable of performing appropriate color correction on an image pickup signal that is obtained with use of a dimming device.

An image pickup apparatus according to an embodiment of the present disclosure includes: a dimming device configured to adjust light quantity of incident image pickup light; an image pickup device configured to obtain an image pickup signal based on image pickup light emitted from the dimming device; and a color correction processing section configured to perform color correction on the image pickup signal that is obtained by the image pickup device, based on information relating to light quantity of the image pickup light emitted from the dimming device. The color correction processing section performs the color correction to allow a color balance value of the image pickup signal to be substantially constant independent of the light quantity of the image pickup light emitted from the dimming device.

A color correction method according to an embodiment of the present disclosure includes steps of: obtaining an image pickup signal by an image pickup device based on image pickup light emitted from a dimming device, the dimming device being configured to adjust light quantity of incident image pickup light; and performing color correction on the image pickup signal obtained by the image pickup device, based on information relating to light quantity of the image pickup light emitted from the dimming device. In the step of performing the color correction, the color correction is performed to allow a color balance value of the image pickup signal to be substantially constant independent of the light quantity of the image pickup light emitted from the dimming device.

A color correction program according to an embodiment of the present disclosure causes a computer to execute steps of: obtaining an image pickup signal that is obtained by an image pickup device, based on image pickup light emitted from a dimming device, the dimming device being configured to adjust light quantity of incident image pickup light; and performing color correction on the image pickup signal, based on information relating to light quantity of the image pickup light emitted from the dimming device. In the step of performing the color correction, the color correction is performed to allow a color balance value of the image pickup signal to be substantially constant independent of the light quantity of the image pickup light emitted from the dimming device.

In the image pickup apparatus, the color correction method, and the color correction program according to the respective embodiments of the present disclosure, based on the information relating to the light quantity of the image pickup light emitted from the dimming device, the color correction to the image pickup signal is performed to allow the color balance value of the image pickup signal obtained by the image pickup device to be substantially constant independent of the light quantity of the image pickup light emitted from the dimming device. In other words, the color correction in consideration of the information relating to the light quantity of the image pickup light emitted from the dimming device is achieved.

According to the image pickup apparatus, the color correction method, and the color correction program according to the respective embodiments of the present disclosure, the color correction to the image pickup signal obtained by the image pickup device is performed based on the information relating to the light quantity of the image pickup light emitted from the dimming device. Therefore, the color correction in consideration of such information relating to the light quantity is achieved. Therefore, it is possible to perform appropriate color correction on the image pickup signal obtained using the dimming device.

BRIEF DESCRIPTION OF DRAWINGS

FIG. 12 is a diagram illustrating a detailed structure example of the correction table illustrated in FIG. 11.

DESCRIPTION OF EMBODIMENTS

Some embodiments of the disclosure will be described in detail below with reference to the accompanying drawings. Note that description will be given in the following order.
1. First Embodiment (an example of performing color correction with use of drive voltage information and temperature information)
2. Second Embodiment (an example of performing color correction with use of light transmittance information and temperature information)
3. Modifications
   Modification 1 (an example of performing color correction with use of drive voltage information (an example not using temperature information))
   Modification 2 (an example of performing color correction with use of light transmittance information (an example not using temperature information))
4. Other Modifications

First Embodiment

Configuration of Image Pickup Apparatus 1

Figure 1:
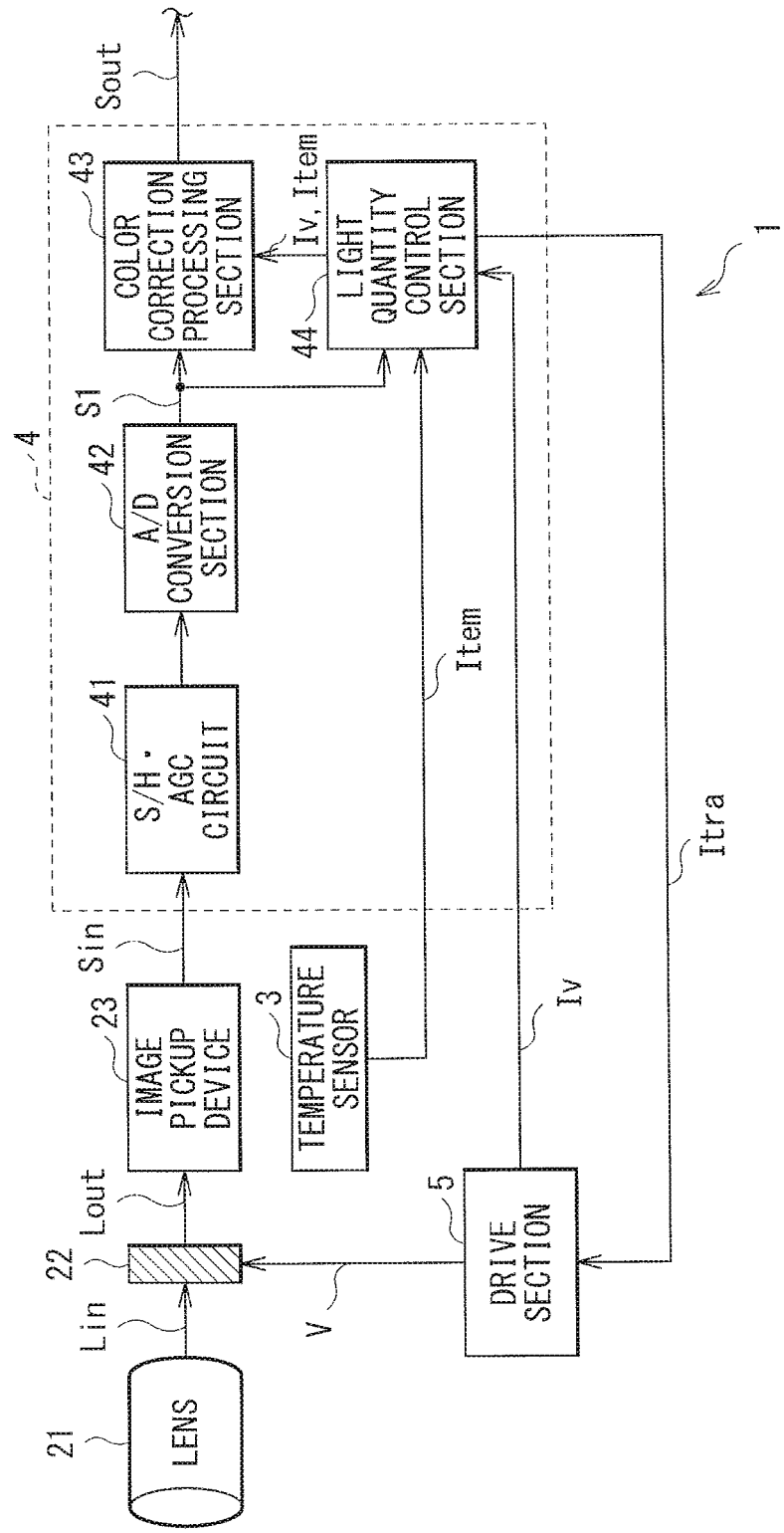
FIG. 1 is a block diagram illustrating a schematic configuration example of an image pickup apparatus according to a first embodiment of the disclosure.

FIG. 1 illustrates a schematic configuration of an image pickup apparatus (an image pickup apparatus 1) according to a first embodiment of the disclosure by way of a block diagram. The image pickup apparatus 1 may be a digital camera (a digital still camera) that converts an optical image from an object into an electrical signal by an image pickup device (an image pickup device 23 described later). Note that the image pickup signal obtained in such a way is capable of being recorded in a semiconductor recording medium (not illustrated) and being displayed on a display unit (not illustrated) such as a liquid crystal display.

The image pickup apparatus 1 includes a lens 21, a dimming device 22, the image pickup device 23, a temperature sensor 3, a signal processing section 4, and a drive section 5. Note that a color correction method according to an embodiment of the disclosure is embodied in the image pickup apparatus 1 of the present embodiment (specifically, in a color correction processing section 43 described later), and thus is described together. The same applies to other embodiment, modifications, and the like described later.

The lens 21 is configured of one lens in this case; however may be configured of a lens group including a plurality of lenses.

Figure 2:
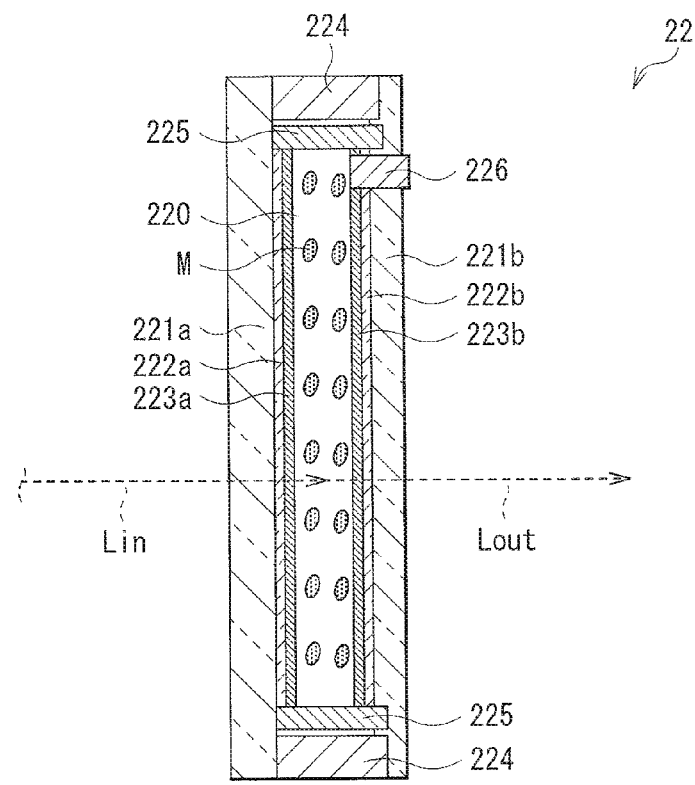
FIG. 2 is a sectional diagram illustrating a configuration example of a liquid crystal dimming device as an example of a dimming device illustrated in FIG. 1.

The dimming device 22 is a device configured to adjust light quantity of the image pickup light (image pickup light Lin) entering from the lens 21 side, and is disposed on an optical path (on an optical path of the image pickup light) between the lens 21 and the image pickup device 23 in this case. As the dimming device 22, for example, a device (a liquid crystal dimming device) that performs electrical light quantity adjustment (dimming) with use of a liquid crystal may be used. Note that the detailed configuration of such a liquid crystal dimming device will be described later (FIG. 2).

The image pickup device 23 is a device configured to detect the image pickup light (image pickup light Lout emitted from the dimming device 22) that enters the image pickup device 23 from the lens 21 through the dimming device 22, to obtain an image pickup signal Sin. The image pickup device 23 may be configured using, for example, an imaging sensor (a solid-state image pickup device) such as CCD (Charge-Coupled Device) and CMOS (Complementary Metal-Oxide Semiconductor).

The temperature sensor 3 is a device that is disposed in the vicinity (peripheral region) of the dimming device 22, and is configured to detect temperature in the vicinity of the dimming device 22. The temperature sensor 3 may be configured using, for example, a thermistor. Note that temperature information Item that is detected in this way and indicates the temperature in the vicinity of the dimming device 22 is output to a light quantity control section 44.

(Signal Processing Section 4)

The signal processing section 4 is configured to perform predetermined signal processing on the image pickup signal Sin obtained by the image pickup device 23, and to perform predetermined feedback control (light quantity control described later) on the dimming device 22. The signal processing section 4 includes an S/H•AGC circuit 41, an A/D conversion section 42, a color correction processing section 43, and the light quantity control section (an light transmittance control section) 44.

The S/H•AGC circuit 41 is a circuit configured to perform S/H (sample and hold) processing on the image pickup signal Sin output from the image pickup device 23, and to perform predetermined signal amplification processing with use of AGC (Automatic Gain Control) function.

The A/D conversion section 42 is configured to perform A/D conversion (analog to digital conversion) processing on an image pickup signal output from the S/H•AGC circuit 41 to generate an image pickup signal S1 as a digital signal.

Figure 3:
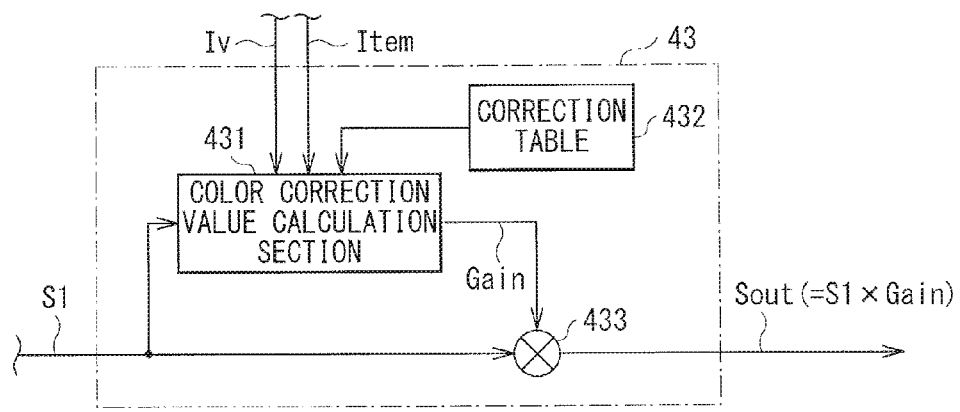
FIG. 3 is a block diagram illustrating a detailed configuration example of a color correction processing section illustrated in FIG. 1.

The color correction processing section 43 is configured to perform color correction processing as image quality improvement processing on the image pickup signal S1 (the digital signal) output from the A/D conversion section 42 to output an image pickup signal Sout after such color correction processing. Although the detail will be described later, the color correction processing section 43 uses the temperature information Item and drive voltage information Iv described later that are supplied from the light quantity control section 44, to perform the color correction processing. In other words, the color correction processing section 43 uses such drive voltage information Iv to perform the color correction processing, thereby performing the color correction processing with indirectly use of light transmittance information Itra (light quantity information) described later. Note that the image pickup signal Sout generated by such color correction processing is output to the outside (a semiconductor recording medium, etc. not illustrated) of the signal processing section 4. In addition, the detailed configuration of the color correction processing section 43 will be described later (FIG. 3).

The light quantity control section 44 supplies a control signal of the dimming device 22 to the drive section 5, to control dimming operation (light quantity adjustment operation) of the dimming device 22. In this case, as the control signal of the dimming device 22, the light transmittance information Itra (light quantity information indicating light quantity (the transmitted light quantity and brightness) of the image pickup light Lout (emission light) emitted from the dimming device 22) indicating the light transmittance of the image pickup light Lin (incident light) of the dimming device 22.

Specifically, the light quantity control section 44 detects a signal vale of the image pickup signal S1 output from the A/D conversion section 42, and then sets the light transmittance information Itra (the light quantity information) based on the signal value (a detection value). In other words, the light quantity control section 44 determines the light quantity (the transmitted light quantity) of the image pickup light Lout emitted from the dimming device 22, based on the signal value of the image pickup signal S1, to output the information Itra relating to the light quantity. In addition, the light quantity control section 44 also has a function of performing predetermined temperature correction (temperature correction of the transmitted light quantity) using the temperature information Item output from the temperature sensor 3 with use of data (a table) indicating "correspondence relationship between the temperature and the transmitted light quantity" that is previously stored in a not-illustrated memory section (a memory).

Figure 4:
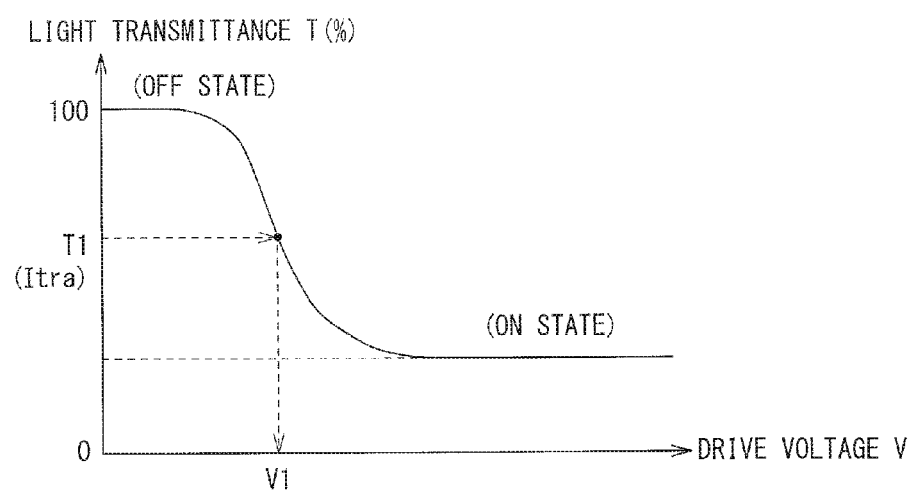
FIG. 4 is a schematic diagram illustrating an example of relationship between a drive voltage and a light transmittance of incident light in the liquid crystal dimming device illustrated in FIG. 2.

The drive section 5 is configured to perform drive operation on the dimming device 22 based on the light transmittance information Itra (the light quantity information) supplied from the light quantity control section 44. Specifically, the drive section 5 determines drive voltage V to the dimming device 22 based on such light transmittance information Itra, and supplies the drive voltage V to the dimming device 22 (between transparent electrodes 221a and 221b described later), thereby performing the drive operation. In this case, the information indicating the drive voltage V determined at that time corresponds to the above-described drive voltage information Iv. Note that the detail of a method of determining the drive voltage V will be described later (FIG. 4).

Detailed Configuration Example of Dimming Device 22

FIG. 2 schematically illustrates a cross-sectional surface configuration example of the dimming device 22 (the liquid crystal dimming device). The dimming device 22 has a stacked structure in which a transparent substrate 221a, a transparent electrode 222a, an alignment film 223a, a liquid crystal layer 220, an alignment film 223b, a transparent electrode 222b, and a transparent electrode 221b are stacked in this order from an incident side of the image pickup light Lin toward an emission side of the image pickup light Lout. Moreover, the dimming device 22 also includes a sealing agent 224, a spacer 225, and a sealing section 226.

The liquid crystal layer 220 is a layer containing liquid crystal molecules, and in this case, containing predetermined pigment molecules (dichroic dye molecules) in addition to the liquid crystal molecules (the liquid crystal molecules and the pigment molecules are collectively denoted by molecules M for simplification of illustration in FIG. 2). In other words, the dimming device 22 is configured using a guest-host (GH) type liquid crystal containing a pigment (a dichroic pigment).

Such a liquid crystal of GH type (a GH type liquid crystal) is roughly classified into a negative type and a positive type depending on a long-axis direction of the liquid crystal molecules at the time of voltage application. In the positive GH type liquid crystal, the long-axis direction of the liquid crystal molecules is perpendicular to the optical axis at the time of no-voltage application (in an OFF state), and the long-axis direction of the liquid crystal molecules is parallel to the optical axis at the time of voltage application (in an ON state). On the other hand, in the negative GH type liquid crystal, the long axis direction of the liquid crystal molecules is parallel to the optical axis at the time of no-voltage application, and the long-axis direction of the liquid crystal molecules is perpendicular to the optical axis at the time of voltage application. In this case, the pigment molecules are aligned in the direction same as that of the liquid crystal molecules, and thus when the positive liquid crystal is used as a host, the light transmittance is relatively low (the light emission side is relatively dark) at the time of no-voltage application, and the light transmittance is relatively high (the light emission side is relatively bright) at the time of voltage application. On the other hand, when the negative liquid crystal is used as a host, inversely, the light transmittance is relatively high (the light emission side is relatively bright) at the time of no-voltage application, and the light transmittance is relatively low (the light emission side is relatively dark) at the time of voltage application. Note that, in the present embodiment, the liquid crystal layer 260 may be configured of either one of the positive liquid crystal or the negative liquid crystal; however, the case where the liquid crystal layer 260 is configured of the negative liquid crystal is described as a representative.

Each of the transparent electrodes 222a and 222b is an electrode configured to apply a voltage (the drive voltage V) to the liquid crystal layer 220, and may be formed of, for example, Indium Tin Oxide (ITO). Note that wirings (not illustrated) to electrically connected to the transparent electrodes 222a and 222b may be disposed as appropriate.

Each of the alignment films 223a and 223b is a film to align the liquid crystal molecules in the liquid crystal layer 220 in a desired direction (an alignment direction). Each of the alignment films 223a and 223b may be formed of, for example a polymer material such as polyimide, and is previously subjected to rubbing treatment in a predetermined direction to allow the alignment direction of the liquid crystal molecules to be set.

The transparent substrate 221a is a one-side substrate that supports the transparent electrode 222a and the alignment film 223a and seals the liquid crystal layer 220. The transparent substrate 221b is the other-side substrate that supports the transparent electrode 222b and the alignment film 223b and seals the liquid crystal layer 220. Each of the transparent substrates 221a and 221b may be formed of, for example, a glass substrate.

The sealing agent 224 is a member to seal molecules M (the liquid crystal molecules and the pigment molecules) in the liquid crystal layer 220 from side surface sides, and may be formed of, for example, an adhesive agent such as an epoxy adhesive agent and an acrylic adhesive agent. The spacer 225 is a member to maintain a constant cell gap (a constant thickness) of the liquid crystal layer 220, and may be formed of, for example a predetermined resin material or a glass material. The sealing section 226 is a sealing port used when the molecules M are sealed into the liquid crystal layer 220, and is a part to subsequently seal the molecules M in the liquid crystal layer 220 from outside.

Detailed Configuration Example of Color Correction Processing Section 43

FIG. 3 illustrates a detailed configuration example of the color correction processing section 43 by way of a block diagram. The color correction processing section 43 includes a color correction value calculation section 431, a correction table 432 (a second correction table), and a multiplication section 433.

The color correction value calculation section 431 uses the image pickup signal S1, the drive voltage information Iv and the temperature information Item that are supplied from the light quantity control section 44, and the correction table 432, to obtain color correction values Gain (gain values) for the color correction processing.

Figure 6:
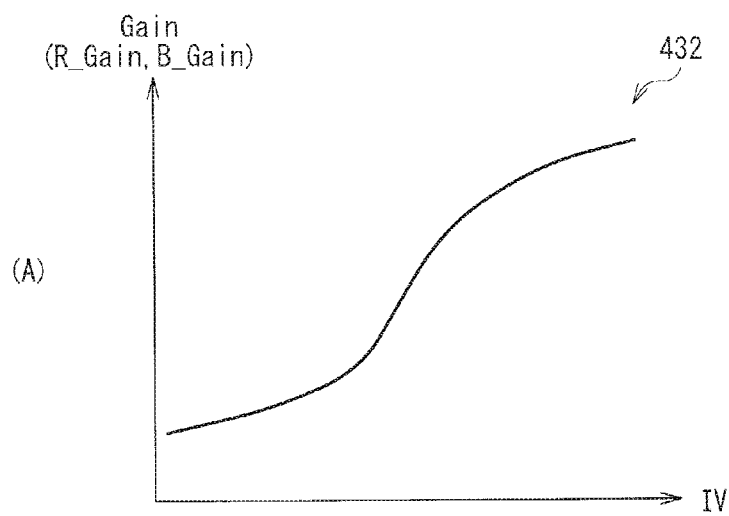
FIG. 6 is a schematic diagram illustrating an example of a correction table illustrated in FIG. 4.
Figure 6:
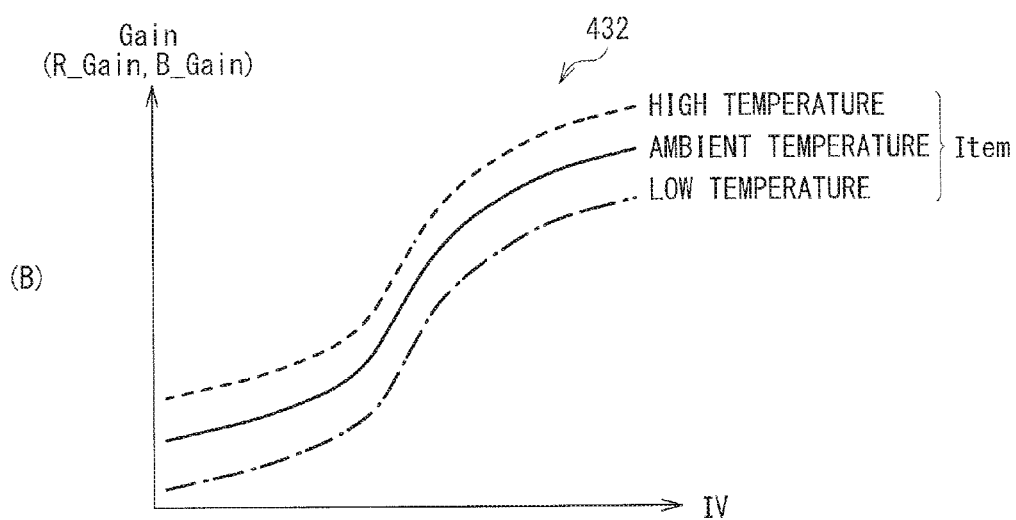

The correction table 432 is a table that is configured by making the drive voltage information Iv correspond to the color correction values Gain previously, and in particular in this case, the temperature information is also made correspond thereto. Such a correction table 432 may be held in advance in a not-illustrated memory section (the memory), for example. Note that the detailed structure of the correction table 432 will be described later (FIG. 6).

The multiplication section 433 multiplies the image pickup signal S1 by the color correction values Gain output from the color correction value calculation section 431, to generate an image pickup signal Sout (=S1×Gain) after the color correction processing.

Function and Effects of Image Pickup Apparatus 1

(1. Image Pickup Operation)

As illustrated in FIG. 1, in the image pickup apparatus 1, the image pickup light Lin emitted from the lens 21 enters the dimming device 22, and the light quantity (the transmitted light quantity) of the image pickup light Lin is adjusted to be output as the image pickup light Lout. The image pickup light Lout enters the image pickup device 23, and then is detected, and thus the image pickup signal Sin is obtained.

At this time, in the dimming device 22 (the liquid crystal dimming device) illustrated in FIG. 2, for example, the image pickup light Lin (the incident light) passes through the liquid crystal layer 220 and the like, and is emitted as the image pickup light Lout (the emission light). At this time, when a predetermined voltage (the drive voltage V) is applied between the transparent electrodes 222a and 222b, the alignment direction (the long axis direction) of the molecules M (the liquid crystal molecules and the pigment molecules) in the liquid crystal layer 220 changes, and the light quantity (the transmitted light quantity) of the image pickup light Lout that passes through the liquid crystal layer 220 is accordingly changed. In other words, the light transmittance of the incident image pickup light Lin is changed. Therefore, adjustment of the drive voltage V at this time enables electrical (not mechanical) adjustment of the light quantity (the light transmittance of the image pickup light Lin) of the image pickup light Lout that passes through the entire dimming device 22 (enables arbitrary dimming operation). In this way, the light quantity adjustment (dimming) to the image pickup light is performed in the dimming device 22.

Here, FIG. 4 schematically illustrates an example of relationship between the drive voltage V to be applied and the transmittance (a light transmittance T) of the image pickup light Lin in the dimming device 22 (the liquid crystal dimming device). In this example, the negative GH type liquid crystal is used in the liquid crystal layer 220, and illustration is made with the light quantity (the transmitted light quantity) of the image pickup light Lout in the no-voltage application state (in the OFF state) as a reference (100%). It is found from FIG. 4 that, as the drive voltage V is increased, the shielded light quantity in the liquid crystal layer 220 is drastically increased (the light transmittance T is drastically decreased), and is converged to a substantially constant value (in the ON state). Each of the value, the gradient, and the dimming range at the time of such a change of the light transmittance T of the dimming device 22 varies according to the material and the concentration of the liquid crystal layer 220 (the liquid crystal and the pigment), the cell gap (the thickness) of the liquid crystal layer 220, kinds (materials) of the alignment films 223a and 223b, etc. Note that when the positive GH type liquid crystal is used in the liquid crystal layer 220, in contrast to the characteristics in FIG. 4, the transmittance is low in the no-voltage application state, and the light transmittance T is increased as the drive voltage V is increased.

Subsequently, the signal processing section 4 performs predetermined signal processing on the image pickup signal Sin obtained as described above, and performs predetermined feedback control (light quantity control) on the dimming device 22. More specifically, first, the S/H•AGC circuit 41 performs S/H processing on the image pickup signal Sin and also performs predetermined signal amplification processing using the AGC function on the image pickup signal Sin. Subsequently, the A/D conversion section 42 performs the A/D conversion processing to generate the image pickup signal S1 of the digital signal. Then, the color correction processing section 43 performs color correction processing described later on the image pickup signal S1 to generate the image pickup signal Sout after the color correction processing.

On the other hand, the light quantity control section 44 in the signal processing section 4 uses a signal value (a detection value) of the image pickup signal S1 and the temperature information Item (the temperature information in the vicinity of the dimming device 22) output from the temperature sensor 3, to set and to the light transmittance information Itra (the light quantity information) as the control signal of the dimming device 22 and output the light transmittance information Itra. Then, the drive section 5 performs the drive operation on the dimming device 22 based on the light transmittance information Itra supplied from the light quantity control section 44. More specifically, the drive section 5 determines the drive voltage V of the dimming device 22 based on such light transmittance information Itra, and supplies the drive voltage V to the dimming device 22 (between the transparent electrodes 221a and 221b) to perform the drive operation. At this time, the drive section 5 uses a characteristic line (for example, see FIG. 4 described above) indicating relationship between the light transmittance T and the drive voltage V in the dimming device 22, to determine the drive voltage V from the light transmittance information Itra. In the example illustrated in FIG. 4, the drive voltage V=V1 is obtained from the light transmittance T1 indicated by the light transmittance information Itra.

(2. Color Correction Processing)

Incidentally, in the image pickup signal obtained through the dimming device, typically, color balance (color shade, white balance) of the image pickup signal is shifted depending on situations, which causes degradation in quality of a picked-up image in some cases.

Figure 5:
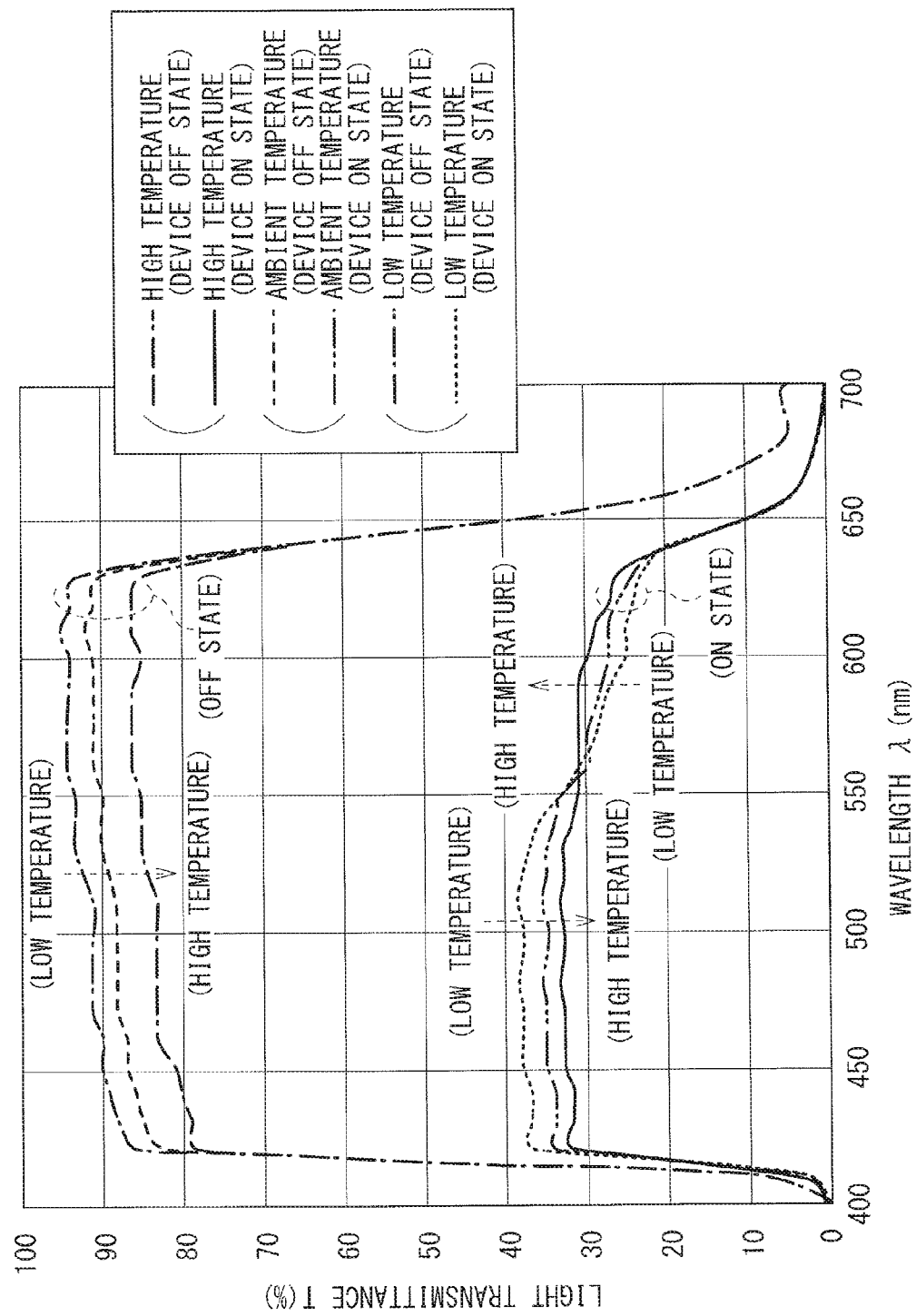
FIG. 5 is a characteristic diagram illustrating an example of relationship between a wavelength of the incident light and transmittance in the liquid crystal dimming device.

Specifically, for example, as illustrated in FIG. 5, first, the light transmittance of the image pickup light slightly varies according to the wavelength region of the image pickup light both in the ON state (shielded state) and the OFF state (non-shielded state) of the dimming device. In addition, in the ON state in particular, the light transmittance for each wavelength range does not uniformly vary according to the variation of the temperature (the environment temperature in the vicinity of the dimming device). Specifically, in this example, the light transmittance is decreased as the temperature is increased from low to high in each of blue (B) wavelength region and green (G) wavelength region, whereas the light transmittance is increased as the temperature is increased from low to high in red (R) wavelength region. In this way, the color shade of the image pickup light that has passed through the dimming device is changed according to the transmitted light quantity (brightness) and the temperature of the image pickup light at that time, and thus the color balance (white balance) of the image pickup signal is changed. Note that such a shift of the color balance in the image pickup signal remarkably occurs in the case of the liquid crystal dimming device.

Therefore, in the present embodiment, the color correction processing section 43 in the signal processing section 4 performs color correction processing described below on the image pickup signal (in this case, the image pickup signal S1 after the subsequent signal processing) obtained through the dimming device 22, to reduce the shift of the color balance described above.

In other words, as illustrated in FIG. 1 and FIG. 3, the color correction processing section 43 indirectly uses information (the light transmittance information Itra) relating to the light quantity (the transmitted light quantity) of the image pickup light Lout emitted from the dimming device 22, to perform the color correction processing on the image pickup signal S1. Specifically, the color correction processing section 43 uses the drive voltage information Iv (the information indicating the drive voltage V of the dimming device 22) and the temperature information Item (the information indicating the temperature in the vicinity of the dimming device 22) that are supplied from the light quantity control section 44, to perform such color correction processing. More specifically, the color correction processing section 43 uses the correction table 432 that is configured by making the drive voltage information Iv correspond to the color correction values Gain previously, to perform the color correction processing.

For example, as illustrated in (A) of FIG. 6, as the correction table 432, a table that is configured by making the values of the drive voltage information Iv correspond to the color correction values Gain (for example, a red color correction value R_Gain and blue color correction value B_Gain) by a predetermined characteristic line may be used. Alternatively, for example, as illustrated in (B) of FIG. 6, a table that is configured by making the values of the drive voltage information Iv correspond to the color correction values Gain for each value (low temperature, ambient temperature, high temperature, and the like) of the temperature information Item by a predetermined characteristic line may be used. Note that, in this case, caused by the fact that the relationship between the drive voltage V and the light transmittance T in the dimming device 22 (the liquid crystal dimming device) is typically defined by a characteristic line formed of a cubic expression, the characteristic line defining the correspondence therebetween in the correction table 432 is also a characteristic line formed of a cubic expression. In other words, a correction expression defining the correspondence in the correction table 432 is a cubic expression in this case.

Further, the color correction processing section 43 uses the color correction values Gain obtained by such a correction table 432 to perform the color correction processing so that the color balance value of the image pickup signal Sout is substantially constant (desirably constant) independent of both the light quantity of the image pickup light Lout emitted from the dimming device 22 and the temperature in the vicinity of the dimming device 22. Specifically, in the present embodiment, the color correction processing section 43 may perform the color correction processing in a manner as illustrated in FIG. 7, for example.

Figure 7:
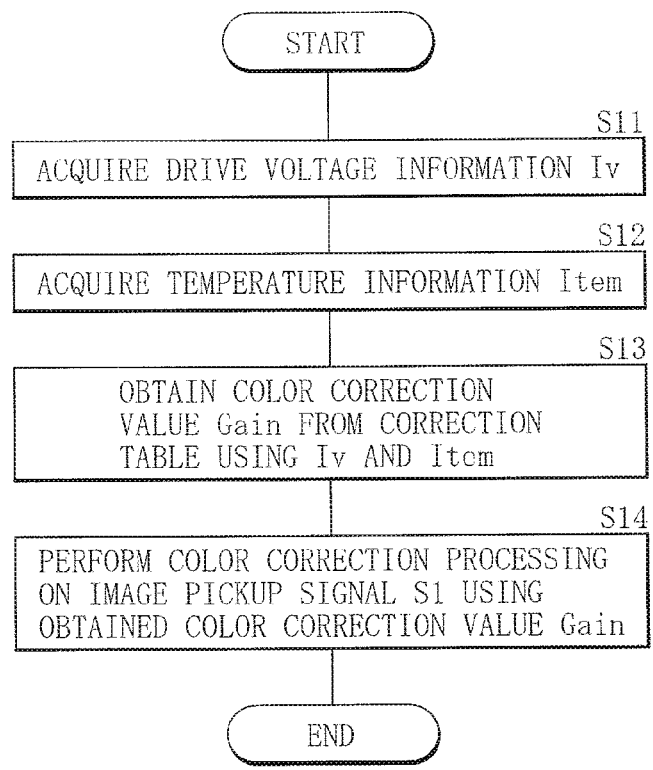
FIG. 7 is a flowchart illustrating an example of color correction processing according to the first embodiment.

More specifically, as described above, the color correction processing section 43 acquires the drive voltage information Iv and the temperature information Item from the light quantity control section 44 (steps S11 and S12 in FIG. 7). Then, the color correction processing section 43 uses the drive voltage information Iv and the temperature information Item that are acquired in such a way, to obtain the color correction values Gain from the above-described correction table 432 (step S13).

Figure 8:
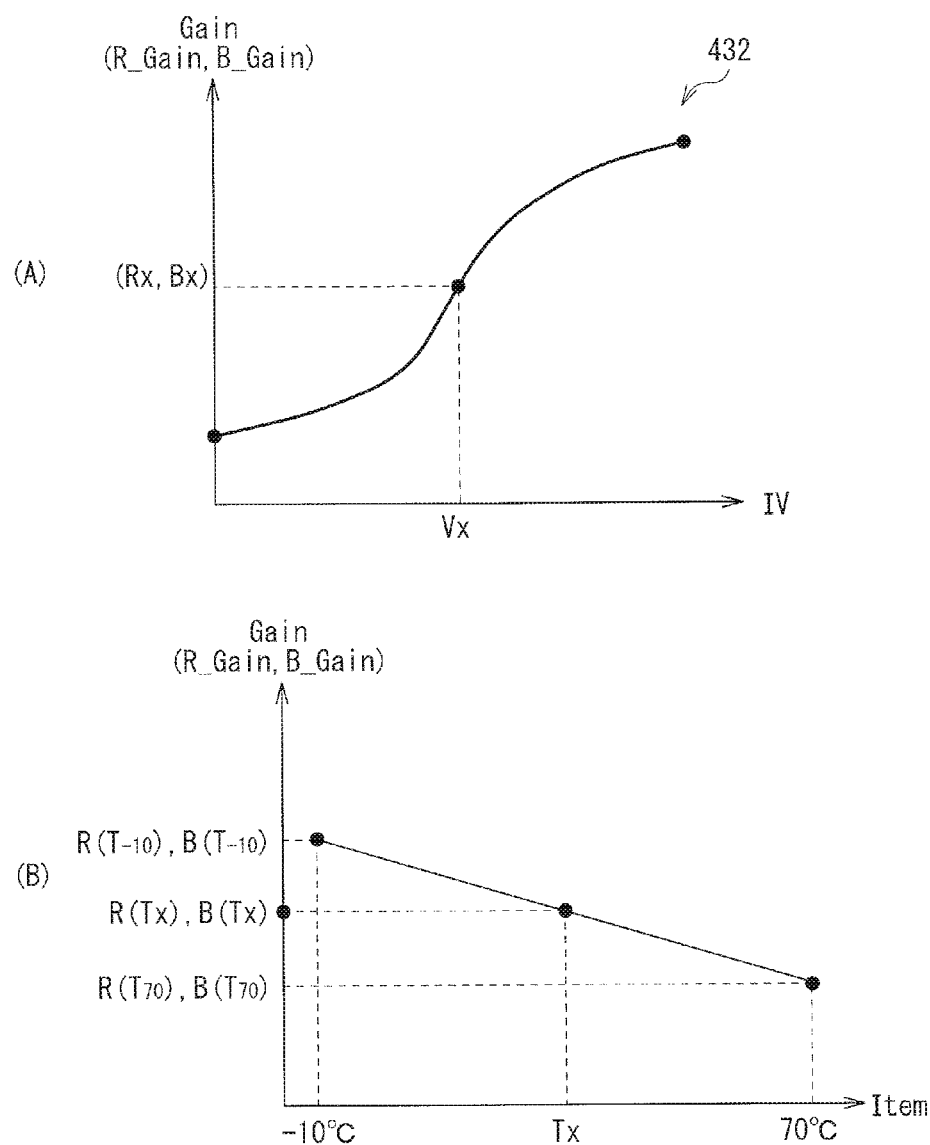
FIG. 8 is a schematic diagram illustrating a calculation example of a color correction value in the color correction processing illustrated in FIG. 7.

Specifically, for example, as illustrated in (A) of FIG. 8, first, the color correction values Gain (for example, the red color correction value R_Gain=Rx and the blue color correction value B_Gain=Bx) are obtained from the drive voltage Vx that is indicated by the drive voltage information Iv. The cubic expression (an approximate expression) in the correction table 432 at this time may be expressed by the following expressions (1) and (2), for example. Note that coefficients $a_R$, $b_R$, $c_R$, $d_R$, $a_B$, $b_B$, $c_B$, and $d_B$ in the expressions are held in the correction table 432. In such a way, the color correction values Gain by the drive voltage V are first obtained.

$$Rx = a_R \times Vx^3 + b_R \times Vx^2 + c_R \times Vx + d_R \tag{1}$$

$$Bx = a_B \times Vx^3 + b_B \times Vx^2 + c_B \times Vx + d_B \tag{2}$$

Next, for example, as illustrated in (B) of FIG. 8, the color correction processing section 43 obtains the color correction values Gain in consideration of the temperature (the temperature in the vicinity of the dimming device 22) indicated by the temperature information Item. This is because the color correction values Gain each vary according to the temperature even if the drive voltage V is the same, as illustrated in (B) of FIG. 6 described above. However, for example, as illustrated in (B) of FIG. 8, since there is linear relationship between the temperature and the color correction values Gain, for example, the color correction values Gain, for example, only at two temperatures, at high temperature (70° C. in this case) and at low temperature (-10° C. in this case) may be held in the correction table 432. In this case, the color correction values R_Gain and B_Gain at 70° C. are denoted by $R(T_{70})$ and $B(T_{70})$, respectively, and the color correction values R_Gain and B_Gain at -10° C. are denoted by $R(T_{-10})$ and $B(T_{-10})$, respectively. In addition, the color correction values Gain at the temperature therebetween (R_Gain=$R(T_x)$ and B_Gain=$B(T_x)$) are obtained from the linear interpolation expressed by the following expressions (3) to (5). In this way, the color correction values Gain in consideration of the temperature in the vicinity of the dimming device 22 are obtained $$R(T_x) = R(T_{-10}) + \alpha \times \{R(T_{70}) - R(T_{-10})\} \tag{3}$$

$$B(T_x) = B(T_{-10}) + \alpha \times \{B(T_{70}) - B(T_{-10})\} \tag{4}$$

$$\alpha = [Tx/\{70-(-10)\}] \tag{5}$$

As described above, the color correction processing section 43 finally multiplies the image pickup signal S1 by the color correction values Gain thus obtained to generate the image pickup signal Sout (=S1×Gain) after the color correction processing. In this way, the color correction processing by the color correction processing section 43 is ended.

In the present embodiment, the color correction in consideration of the information (the light transmittance information Itra) relating to the light quantity of the image pickup light Lout emitted from the dimming device 22 is achieved by such color correction processing. In addition, in this case in particular, the color correction is performed in consideration of the temperature information (the temperature information Item) in the vicinity of the dimming device 22, in addition to such information (the light transmittance information Itra) relating to the light quantity.

As described above, in the present embodiment, the color correction processing to the image pickup signal S1 obtained through the dimming device 22 is performed based on (in this case, with indirectly use of) the information (the light transmittance information Itra) relating to the light quantity of the image pickup light Lout emitted from the dimming device 22. Therefore, it is possible to achieve the color correction in consideration of such information relating to the light quantity. Accordingly, it is possible to perform appropriate color correction on the image pickup signal obtained with use of the dimming device 22.

Moreover, in the present embodiment, in particular, the color correction processing is performed also with use of the temperature information Item indicating the temperature in the vicinity of the dimming device 22, in addition to the information (the light transmittance information Itra) relating to the light quantity. Therefore, it is possible to achieve color reproduction including the temperature characteristics.

Second Embodiment

Configuration of Image Pickup Apparatus 1A

Figure 9:
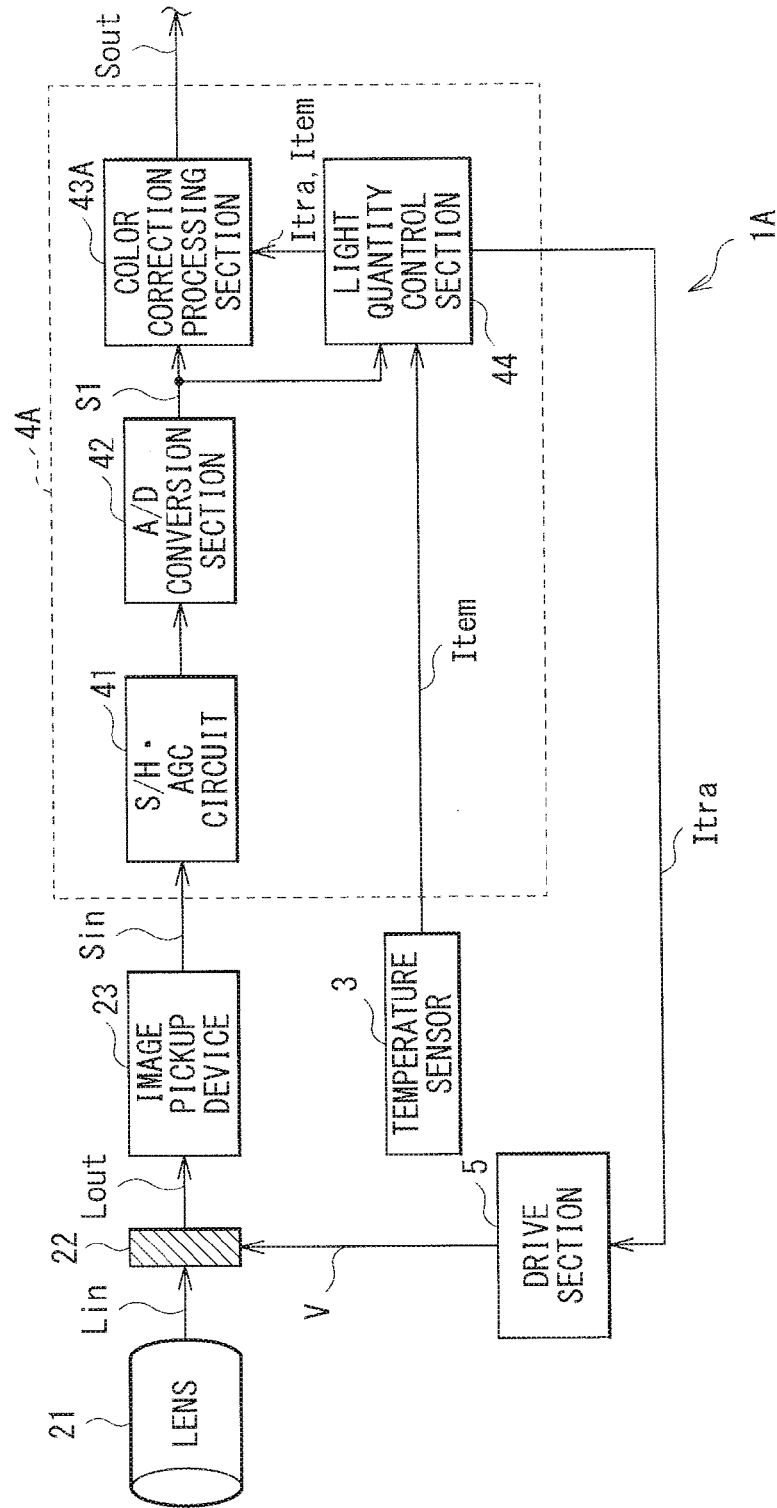
FIG. 9 is a block diagram illustrating a schematic configuration example of an image pickup apparatus according to a second embodiment.

FIG. 9 illustrates a schematic configuration of an image pickup apparatus (an image pickup apparatus 1A) according to a second embodiment of the present disclosure by way of a block diagram. The image pickup apparatus 1A has a signal processing section 4A in place of the signal processing section 4 in the image pickup apparatus 1 of the first embodiment, and other configurations thereof are similar to those of the image pickup apparatus 1. Incidentally, in the following description, like numerals are used to designate substantially like components in the first embodiment, and description thereof is appropriately omitted.

The signal processing section 4A has a color correction processing section 43A in place of the color correction processing section 43 in the signal processing section 4 according to the first embodiment, and other configurations thereof are similar to those of the signal processing section 4. Unlike the color correction processing section 43, the color correction processing section 43A uses the temperature information Item and the light transmittance information Itra (the light quantity information) that are supplied from the light quantity control section 44, to perform the color correction processing. In other words, the color correction processing section 43 indirectly uses the information (the light transmittance information Itra) relating to the light quantity of the image pickup light Lout to perform the color correction processing, whereas the color correction processing section 43A directly uses the information relating to the light quantity of the image pickup light Lout to perform the color correction processing.

Figure 10:
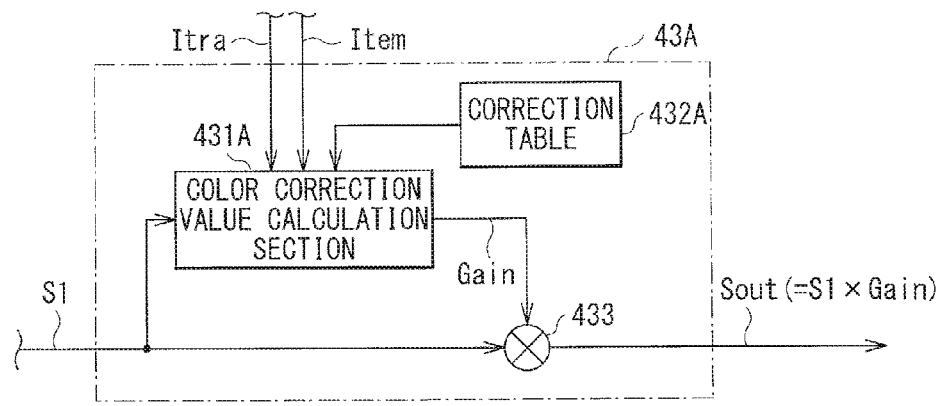
FIG. 10 is a block diagram illustrating a detailed configuration example of a color correction processing section illustrated in FIG. 9.

For example, as illustrated in FIG. 10, the color correction processing section 43A may include a color correction value calculation section 431A, a correction table 432A, and the multiplication section 433. In other words, the color correction processing section 43A has the color correction value calculation section 431A and the correction table 432A (a first correction table) in place of the color correction value calculation section 431 and the correction table 432 in the color correction processing section 43.

The color correction value calculation section 431A uses the image pickup signal S1, the light transmittance information Itra and the temperature information Item that are supplied from the light quantity control section 44, and the correction table 432, to obtain the color correction values Gain in the color correction processing.

The correction table 432A is a table that is configured by making the light transmittance information Itra correspond to the color correction values Gain previously, and in this case in particular, the temperature information Item is also made corresponded thereto. Such a correction table 432A may be also previously held in, for example, a memory section (memory) that is not illustrated.

Figure 11:
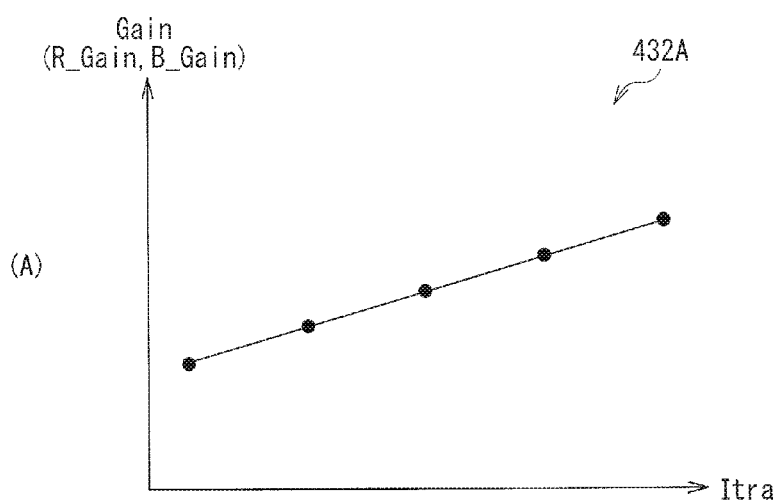
FIG. 11 is a schematic diagram illustrating an example of a color correction table illustrated in FIG. 10.
Figure 11:
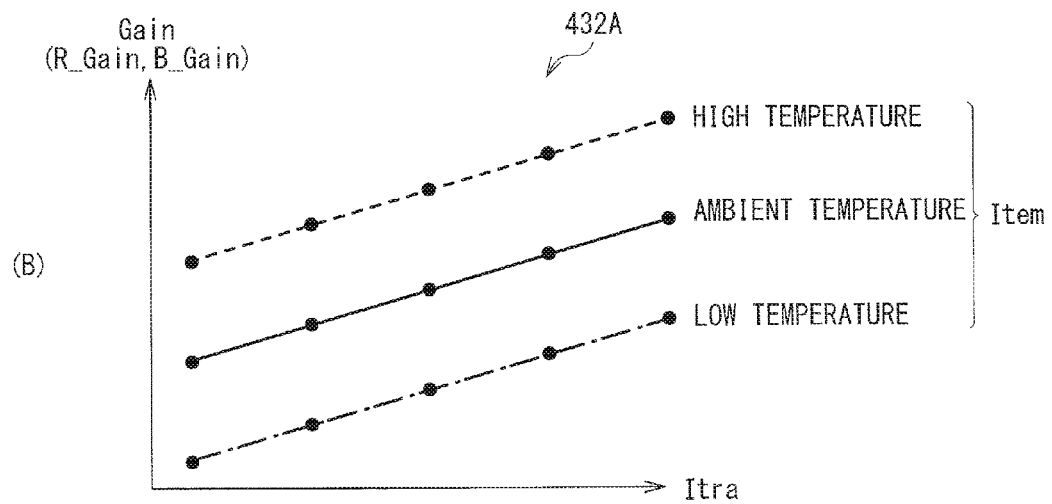

As such a correction table 432A, for example, as illustrated in (A) of FIG. 11, a table that is configured by making the values of the light transmittance information Itra correspond to the color correction values Gain (for example, a red color correction value R_Gain and a blue color correction value B_Gain) by a predetermined characteristic line may be used. Alternatively, for example, as illustrated in (B) of FIG. 11, a table that is configured by making the values of the light transmittance information Itra correspond to the color correction values Gain for each value (low temperature, ambient temperature, high temperature, and the like) of the temperature information Item by a predetermined characteristic line, may be used.

In this case, in the color correction processing of the present embodiment, caused by the fact that the color correction processing is performed with directly use of the light transmittance information Itra as described above, a characteristic line defining the correspondence in the correction table 432A is a characteristic line formed of a linear expression. In other words, the correction expression defining the correspondence in the correction table 432A is a linear expression. Therefore, the values of the light transmittance information Itra and the color correction values Gain have linear relationship. In this way, the correction table 432 according to the first embodiment has a correction expression of a complicated cubic expression, whereas the correction table 432A according to the present embodiment has a correction expression of a linear expression. Accordingly, simple and precise color correction processing as compared with the first embodiment is achieved.

Moreover, in the correction table 432A, a part of the color correction values Gain located on the above-described correction expression (the linear expression) is allowed to be interpolated and generated by linear interpolation (linear function interpolation). Specifically, the color correction values (illustrated by a straight line on the correction expression) other than the color correction values Gain illustrated by dots on the correction expression in (A) and (B) of FIG. 11 may be interpolated and generated by such linear interpolation. In such a case, the structure of the correction table 432A becomes simpler (the data capacity is allowed to be further reduced).

Note that FIG. 12 specifically illustrates an example of such a correction table 432A. In this example, the values of the light transmittance information Itra (defined by a light transmittance ratio with darkest state as a reference) are made correspond to the color correction values Gain (the red color correction value R_Gain and the blue color correction value B_Gain) for each value (−10° C. to 70° C.) of the temperature information Item.

Further, the color correction processing section 43A of the present embodiment also uses the color correction values Gain obtained from such a correction table 432A to perform the color correction processing similarly to that in the first embodiment. Specifically, the color correction processing section 43A performs the color correction processing so that the color valance value of the image pickup signal Sout is substantially constant (desirably constant) independent of both the light quantity of the image pickup light Lout emitted from the dimming device 22 and the temperature in the vicinity of the dimming device 22. More specifically, in the present embodiment, the color correction processing section 43A may perform the color correction processing in a manner as illustrated in FIG. 13, for example.

Figure 13:
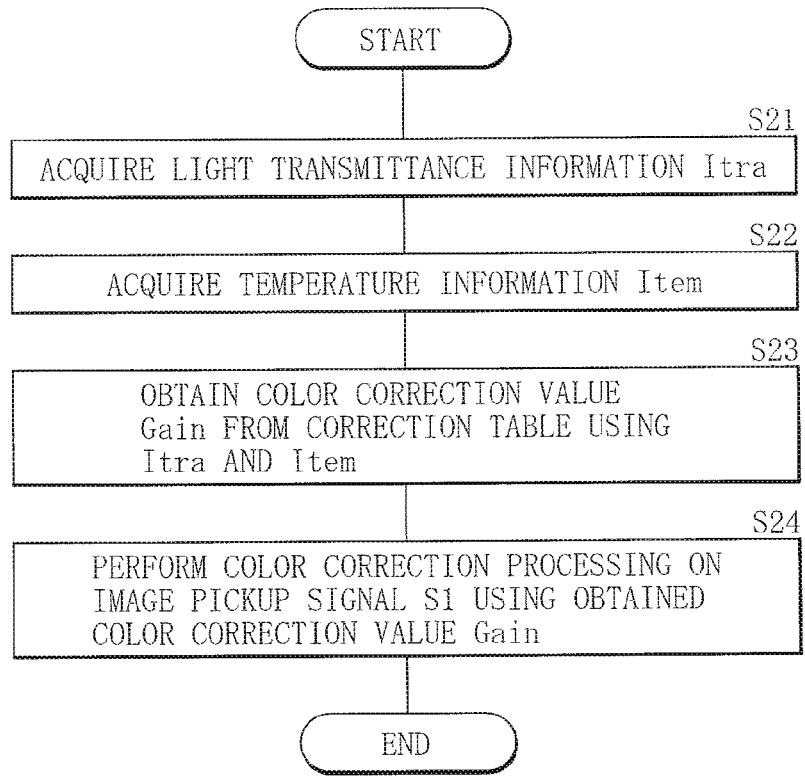
FIG. 13 is a flowchart illustrating an example of color correction processing according to the second embodiment.

To be more specific, as described above, the color correction processing section 43A acquires the light transmittance information Itra and the temperature information Item from the light quantity control section 44 (steps S21 and S22 in FIG. 13). Subsequently, the color correction processing section 43A uses the light transmittance information Itra and the temperature information Item thus acquired to obtain the color correction values Gain from the above-described correction table 432A (step S23).

Figure 14:
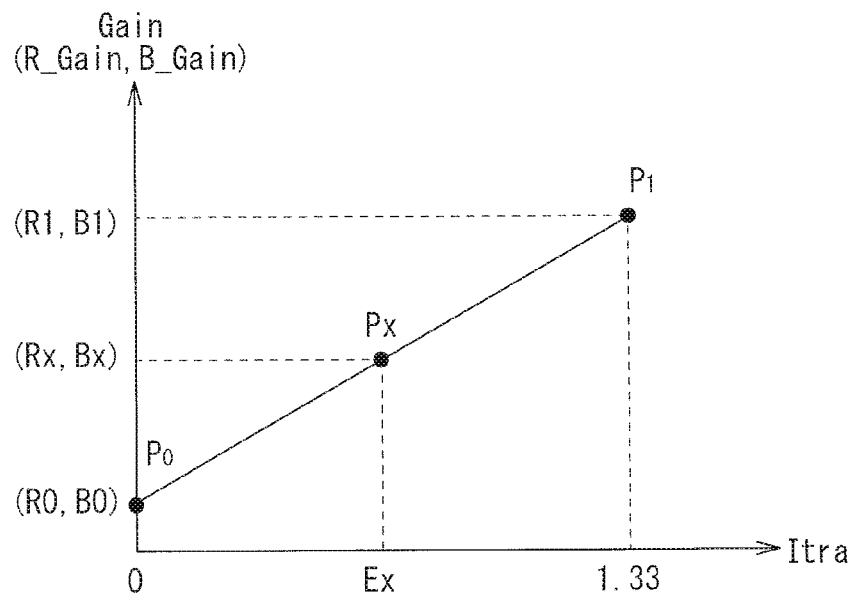
FIG. 14 is a schematic diagram illustrating a calculation example of a color correction value in the color correction processing illustrated in FIG. 13.

Specifically, for example, as illustrated in FIG. 14, the color correction values Gain (for example, R_Gain=Rx and B_Gain=Bx) may be first obtained from a light transmittance Ex that is indicated by the light transmittance information Itra. At this time, unlike the first embodiment, the color correction processing section 43A holds only coordinates of two points P0 and P1 illustrated in FIG. 14 in the correction table 432A, and uses linear interpolation represented by the following expressions (6) to (8) to obtain coordinates of a point Px that defines the color correction values Gain. In this way, the color correction values Gain by the light transmittance are first obtained.

$$Rx = R0 + a \times (R1 - R0) \quad (6)$$

$$Bx = B0 + a \times (B1 - B0) \quad (7)$$

$$a = (Ex/1.33) \quad (8)$$

Next, the color correction processing section 43A obtains the color correction values Gain in consideration of the temperature (the temperature in the vicinity of the dimming device 22) indicated by the temperature information Item in a manner similar to the step S13 described in the first embodiment.

Finally, the color correction processing section 43A, as described above, multiplies the image pickup signal S1 by the color correction values Gain thus obtained to generate the image pickup signal Sout (=S1×Gain) after the color correction processing. In the above-described way, the color correction processing by the color correction processing section 43A is ended.

Function and Effects of Image Pickup Apparatus 1A

Also in the image pickup apparatus 1A of the present embodiment, the similar effects may be basically obtained by the similar function to that of the image pickup apparatus 1 of the first embodiment. Specifically, the color correction in consideration of the information relating to the light quantity is allowed to be achieved, and appropriate color correction is allowed to be performed on the image pickup signal obtained using the dimming device 22. Moreover, since the color correction processing is performed with use of the temperature information Item indicating the temperature in the vicinity of the dimming device 22 in addition to the information (the light transmittance information Itra) relating to the light quantity, color reproduction including temperature characteristics is allowed to be achieved.

Moreover, in the color correction processing section 43A of the present embodiment, in particular, the color correction processing is performed with directly use of the information relating to the light quantity of the image pickup light Lout. Therefore, the correction expression in the correction table 432A is a linear expression, and thus simple and precise color correction processing is allowed to be achieved as compared with the first embodiment.

<Modifications>

Subsequently, modifications (modifications 1 and 2) of the above-described first and second embodiments will be described. Note that like numerals are used to designate substantially like components in the first and second embodiments, and description thereof is appropriately omitted.

Modifications 1 and 2

Figure 15:
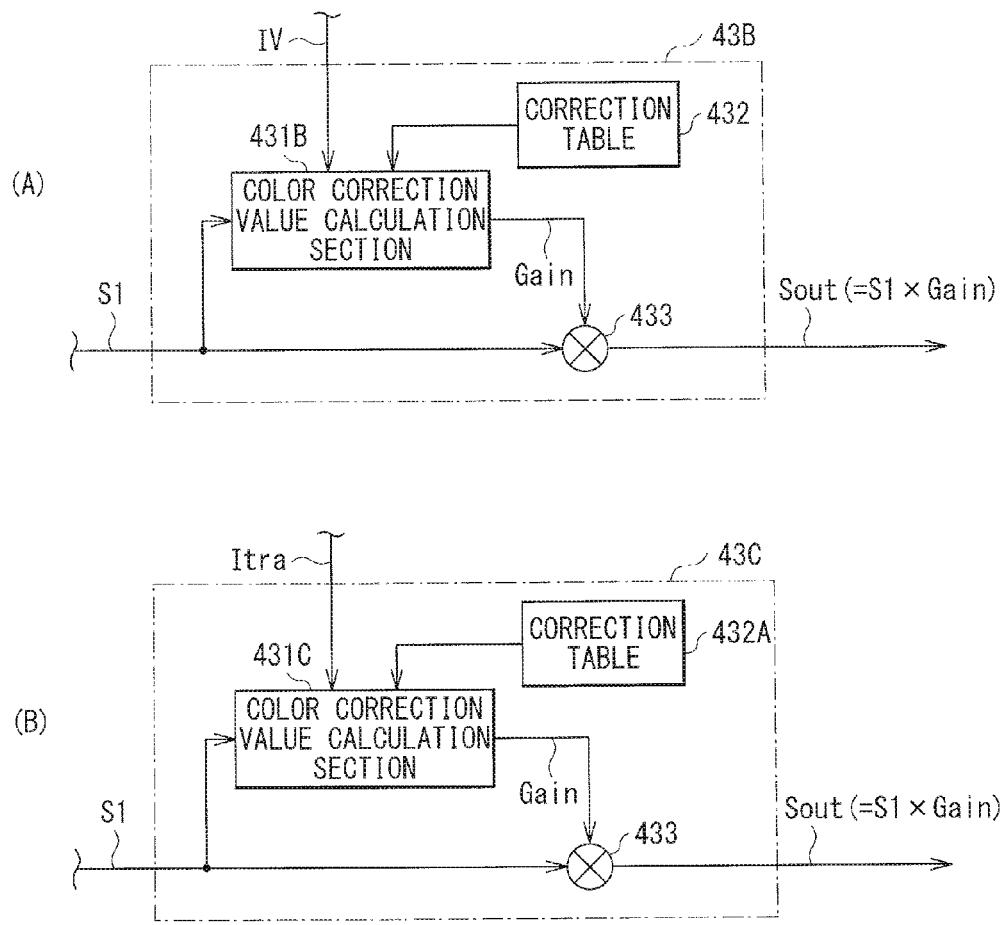
FIG. 15 is a block diagram illustrating a configuration example of a color correction processing section according to modifications 1 and 2.

(A) of FIG. 15 illustrates a block configuration of a color correction processing section (a color correction processing section 43B) according to a modification 1. In addition, (B) of FIG. 15 illustrates a block configuration of a color correction processing section (a color correction processing section 43C) according to a modification 2.

The color correction processing section 43B of the modification 1 has a color correction value calculation section 431B in place of the color correction value calculation section 431 in the color correction processing section 43 of the first embodiment, and other configurations thereof are similar to those of the color correction processing section 43. In the color correction processing section 43B, unlike the color correction processing section 43, the color correction value calculation section 431B uses the drive voltage information Iv supplied from the light quantity control section 44, to perform the color correction processing without using the temperature information Item supplied from the light quantity control section 44. Accordingly, for example, the correction table illustrated in (A) of FIG. 6 described above may be used as the correction table 432 in the present modification.

The color correction processing section 43C of the modification 2 has a color correction value calculation section 431C in place of the color correction value calculation section 431A in the color correction processing section 43A of the second embodiment, and other configurations thereof are similar to those of the color correction processing section 43A. In the color correction processing section 43C, unlike the color correction processing section 43A, the color correction value calculation section 431C uses the light transmittance information Itra (the light quantity information) supplied from the light quantity control section 44, to perform the color correction processing section without using the temperature information Item supplied from the light quantity control section 44. Accordingly, for example, the correction table illustrated in (A) of FIG. 11 described above may be used as the correction table 432A in the present modification.

As with the modifications 1 and 2, the color correction processing may be performed directly or indirectly using the information (the light transmittance information Itra) relating to the light quantity of the image pickup light Lout without using the temperature information Item supplied from the light quantity control section 44. In this case, the color correction processing sections 43B and 43C each perform the color correction processing so that the color balance value of the image pickup signal Sout is substantially constant (desirably constant) independent of the light quantity of the image pickup light Lout emitted from the dimming device 22.

<Other Modifications>

Hereinbefore, although the technology of the present disclosure has been described with referring to some embodiments and the modifications, the technology is not limited to the embodiments and the like, and various modifications may be made.

For example, in the above-described embodiments and the like, the liquid crystal dimming device using GH type liquid crystal has been described as an example, type of the liquid crystal is not limited thereto, and a liquid crystal dimming device using a liquid crystal other than the GH type liquid crystal may be used, and further, a dimming device other than the liquid crystal dimming device may be used.

Specifically, as the dimming device other than the liquid crystal dimming device, dimming devices of the following system may be used. More specifically, for example, a dimming device using a gel material that is used in thermochromism (practical examples: a mug, a polymer sheet, and the like) and thermotropic, a dimming device using a material in photochromic (practical examples: sunglass changed by an ultraviolet ray, and the like), a dimming device using hydrogen gas and the like in gaschromic (practical examples: window glass, and the like), a dimming device using $WO_3$ (tungsten oxide), $Nb_2O_5$ (niobium oxide), NiO (nickel oxide), $Cr_2O_3$ (chromium oxide), and the like in electrochromic (practical examples: window glass, and the like) may be used.

Furthermore, although each component (the block configuration of the signal processing section) of the image pickup apparatus has been specifically described in the above-described embodiment, all of the components are not necessarily provided, and other components may be further provided. For example, although the case where one lens (lens group) is provided in the image pickup apparatus (on the optical path of the image pickup light) has been described as an example in the above-described embodiments and the like, the number of lenses is not limited thereto. In other words, for example, a plurality of lenses (lens groups) may be provided on the optical path of the image pickup light, and alternatively, such a lens (lens group) may not be provided in the image pickup apparatus.

Moreover, the signal processing (the color correction processing and the like) described in the above-described embodiments and the like may be executed by hardware (a circuit) or by software (program). In the case where the signal processing is executed by software, the software is configured of a program group causing a computer (a microcomputer or the like in the image pickup apparatus) to execute each signal processing function (the color correction processing function and the like). For example, each program may be incorporated in dedicated hardware in advance or may be installed from any network or a recording medium to a multipurpose personal computer and used.

Note that the present technology may be configured as follows.

(1) An image pickup apparatus including:
a dimming device configured to adjust light quantity of incident image pickup light;
an image pickup device configured to obtain an image pickup signal based on image pickup light emitted from the dimming device; and
a color correction processing section configured to perform color correction on the image pickup signal that is obtained by the image pickup device, based on information relating to light quantity of the image pickup light emitted from the dimming device, wherein
the color correction processing section performs the color correction to allow a color balance value of the image pickup signal to be substantially constant independent of the light quantity of the image pickup light emitted from the dimming device.

(2) The image pickup apparatus according to (1), wherein the color correction processing section directly uses the information relating to the light quantity to perform the color correction.

(3) The image pickup apparatus according to (2), wherein the color correction processing section uses a first correction table to perform the color correction, the first correction table being configured by making the information relating to the light quantity correspond to color correction values in advance.

(4) The image pickup apparatus according to (3), wherein a correction expression defining the correspondence in the first correction table is a linear expression.

(5) The image pickup apparatus according to (4), wherein a part of the color correction values located on the linear expression is interpolated and generated by linear interpolation.

(6) The image pickup apparatus according to any one of (2) to (5), further including:
a light quantity control section configured to determine the light quantity of the image pickup light emitted from the dimming device, based on a signal value of the image pickup signal, and output the information relating to the light quantity; and
a drive section configured to determine a drive voltage to the dimming device, based on the information relating to the light quantity output from the light quantity control section, and supply the drive voltage to the dimming device, wherein
the color correction processing section acquires the information relating to the light quantity from the light quantity control section.

(7) The image pickup apparatus according to (1), wherein the color correction processing section indirectly uses the information relating to the light quantity to perform the color correction.

(8) The image pickup apparatus according to (7), wherein the color correction processing section uses drive voltage information indicating a drive voltage to the dimming device, to perform the color correction, the drive voltage information being determined based on the information relating to the light quantity.

(9) The image pickup apparatus according to (8), wherein the color correction processing section uses a second correction table to perform the color correction, the second correction table being configured by making the drive voltage information correspond to color correction values in advance.

(10) The image pickup apparatus according to (8) or (9), further including:
a light quantity control section configured to determine the light quantity of the image pickup light emitted from the dimming device, based on a signal value of the image pickup signal, and output the information relating to the light quantity; and
a drive section configured to determine the drive voltage, based on the information relating to the light quantity, and supply the drive voltage to the dimming device, the information relating to the light quantity being output from the light quantity control section, wherein
the color correction processing section acquires the drive voltage information from the drive section through the light quantity control section.

(11) The image pickup apparatus according to any one of (1) to (10), wherein the color correction processing section uses, in addition to the information relating to the light quantity, temperature information indicating temperature in the vicinity of the dimming device to perform the color correction.

(12) The image pickup apparatus according to (11), wherein the color correction processing section performs the color correction to allow the color balance value of the image pickup signal to be substantially constant independent of both the light quantity of the image pickup light emitted from the dimming device and the temperature in the vicinity of the dimming device.

(13) The image pickup apparatus according to any one of (1) to (12), wherein the information relating to the light quantity is information indicating a light transmittance of the dimming device.

(14) The image pickup apparatus according to any one of (1) to (13), wherein the dimming device is a liquid crystal dimming device.

(15) The image pickup apparatus according to any one of (1) to (14), further including one or a plurality of lenses provided on an optical path of the image pickup light.

(16) A color correction method including:

obtaining an image pickup signal by an image pickup device based on image pickup light emitted from a dimming device, the dimming device being configured to adjust light quantity of incident image pickup light; and performing color correction on the image pickup signal obtained by the image pickup device, based on information relating to light quantity of the image pickup light emitted from the dimming device, wherein in performing the color correction, the color correction is performed to allow a color balance value of the image pickup signal to be substantially constant independent of the light quantity of the image pickup light emitted from the dimming device.

(17) A color correction program causing a computer to execute:

obtaining an image pickup signal that is obtained by an image pickup device, based on image pickup light emitted from a dimming device, the dimming device being configured to adjust light quantity of incident image pickup light; and performing color correction on the image pickup signal, based on information relating to light quantity of the image pickup light emitted from the dimming device, wherein in performing the color correction, the color correction is performed to allow a color balance value of the image pickup signal to be substantially constant independent of the light quantity of the image pickup light emitted from the dimming device.

This application is based upon and claims the benefit of priority of the Japanese Patent Application No. 2011-264959 filed in the Japan Patent Office on Dec. 2, 2011, the entire contents of this application are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image pickup apparatus comprising:

a dimming device configured to adjust light quantity of incident image pickup light;

an image pickup device configured to obtain an image pickup signal based on image pickup light emitted from the dimming device; and one or more circuits configured to perform color correction on the image pickup signal that is obtained by the image pickup device, based on information relating to light quantity of the image pickup light emitted from the dimming device, wherein the one or more circuits:

perform the color correction to allow a color balance value of the image pickup signal to be substantially constant independent of the light quantity of the image pickup light emitted from the dimming device, indirectly use the information relating to the light quantity to perform the color correction, and use drive voltage information indicating a drive voltage to the dimming device, to perform the color correction, the drive voltage information being determined based on the information relating to the light quantity.

2. The image pickup apparatus according to claim 1, wherein the one or more circuits are further configured to directly use the information relating to the light quantity to perform the color correction.

3. The image pickup apparatus according to claim 2, wherein the one or more circuits are further configured to use a first correction table to perform the color correction, the first correction table being configured by making the information relating to the light quantity correspond to color correction values in advance.

4. The image pickup apparatus according to claim 2, wherein the one or more circuits are further configured to:

determine the light quantity of the image pickup light emitted from the dimming device, based on a signal value of the image pickup signal, and output the information relating to the light quantity; and determine a drive voltage to the dimming device, based on the information relating to the light quantity being output, and supply the drive voltage to the dimming device, acquire the information relating to the light quantity.

5. The image pickup apparatus according to claim 1, wherein the one or more circuits are further configured to use a second correction table to perform the color correction, the second correction table being configured by making the drive voltage information correspond to color correction values in advance.

6. The image pickup apparatus according to claim 1, wherein the one or more circuits are further configured to:

determine the light quantity of the image pickup light emitted from the dimming device, based on a signal value of the image pickup signal, and output the information relating to the light quantity;

determine the drive voltage, based on the information relating to the light quantity being output, and supply the drive voltage to the dimming device, and acquire the drive voltage information.

7. The image pickup apparatus according to claim 1, wherein the one or more circuits are further configured to use, in addition to the information relating to the light quantity, temperature information indicating temperature in the vicinity of the dimming device to perform the color correction.

8. The image pickup apparatus according to claim 7, wherein the one or more circuits are further configured to perform the color correction to allow the color balance value of the image pickup signal to be substantially constant independent of both the light quantity of the image pickup light emitted from the dimming device and the temperature in the vicinity of the dimming device.

9. The image pickup apparatus according to claim 1, wherein the information relating to the light quantity is information indicating a light transmittance of the dimming device.

10. The image pickup apparatus according to claim 1, wherein the dimming device is a liquid crystal dimming device.

11. The image pickup apparatus according to claim 1, further comprising one or a plurality of lenses provided on an optical path of the image pickup light.

12. An image pickup apparatus comprising:
- a dimming device configured to adjust light quantity of incident image pickup light;
- an image pickup device configured to obtain an image pickup signal based on image pickup light emitted from the dimming device; and
- one or more circuits configured to perform color correction on the image pickup signal that is obtained by the image pickup device, based on information relating to light quantity of the image pickup light emitted from the dimming device,
- wherein the one or more circuits:
- perform the color correction to allow a color balance value of the image pickup signal to be substantially constant independent of the light quantity of the image pickup light emitted from the dimming device,
- directly use the information relating to the light quantity to perform the color correction, and
- use a first correction table to perform the color correction, the first correction table being configured by making the information relating to the light quantity correspond to color correction values in advance,
- wherein a correction expression defining the correspondence in the first correction table is a linear expression.

13. The image pickup apparatus according to claim 12, wherein a part of the color correction values located on the linear expression is interpolated and generated by linear interpolation.

14. A color correction method comprising:
- obtaining an image pickup signal by an image pickup device based on image pickup light emitted from a dimming device, the dimming device being configured to adjust light quantity of incident image pickup light; and
- performing color correction on the image pickup signal obtained by the image pickup device, based on information relating to light quantity of the image pickup light emitted from the dimming device,
- wherein in performing the color correction, the color correction is performed to allow a color balance value of the image pickup signal to be substantially constant independent of the light quantity of the image pickup light emitted from the dimming device,
- wherein drive voltage information indicating a drive voltage to the dimming device is determined based on the information relating to the light quantity, the drive voltage information being used to perform the color correction.

15. A non-transitory computer-readable medium having stored thereon a set of computer-executable instructions for causing a computer to execute a method comprising:
- obtaining an image pickup signal by an image pickup device based on image pickup light emitted from a dimming device, the dimming device being configured to adjust light quantity of incident image pickup light; and
- performing color correction on the image pickup signal obtained by the image pickup device, based on information relating to light quantity of the image pickup light emitted from the dimming device,
- wherein in performing the color correction, the color correction is performed to allow a color balance value of the image pickup signal to be substantially constant independent of the light quantity of the image pickup light emitted from the dimming device,
- wherein drive voltage information indicating a drive voltage to the dimming device is determined based on the information relating to the light quantity, the drive voltage information being used to perform the color correction.

* * * * *